United States Patent [19]

Furst

[11] 3,807,651

[45] Apr. 30, 1974

[54] TAPE ROLL LOADING AND CENTERING DEVICE FOR TAPE TRANSPORT

[75] Inventor: Marcel Furst, Sunnyvale, Calif.

[73] Assignee: Newell Industries Inc., Sunnyvale, Calif.

[22] Filed: July 31, 1972

[21] Appl. No.: 276,686

[52] U.S. Cl. .................. 242/192, 242/197, 274/4 C

[51] Int. Cl. ......................... G03b 1/04, G11b 15/32

[58] Field of Search .................... 242/192, 197–200, 242/76; 274/4 C, 11 C

[56] References Cited

UNITED STATES PATENTS 2,676,766 4/1954 Ross et al. ........................... 242/76

*Primary Examiner*—Leonard D. Christian

*Attorney, Agent, or Firm*—Flehr, Hohbach, Test, Albritton & Herbert

[57] ABSTRACT

A tape transport characterized by a movable carriage for supporting a cartridge containing a roll of tape includes means for first centering the roll of tape on the axis of rotation of a spindle supported by the carriage and, under application of pressure to the cartridge envelope, the end of the hub portion of the roll registers squarely against a registration surface disposed normal to the axis of rotation of the spindle so as to minimize run-out in feeding the tape from the cartridge as well as to center the mid-plane of the roll within the cartridge envelope.

7 Claims, 8 Drawing Figures

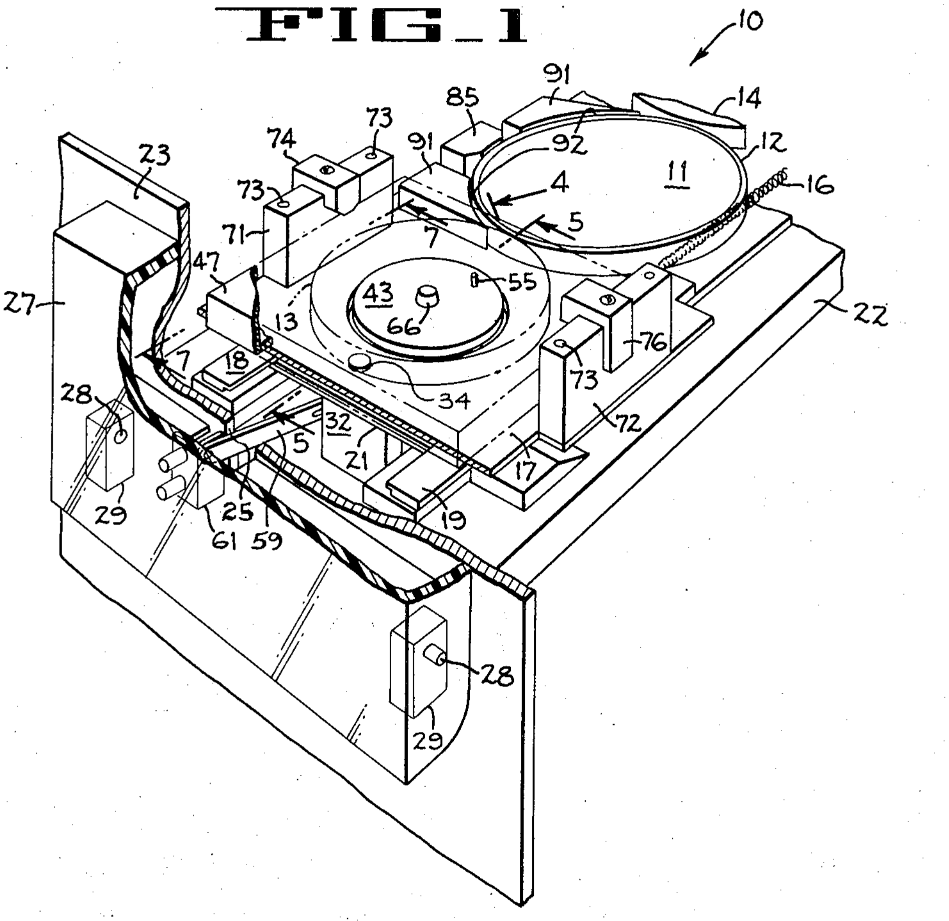
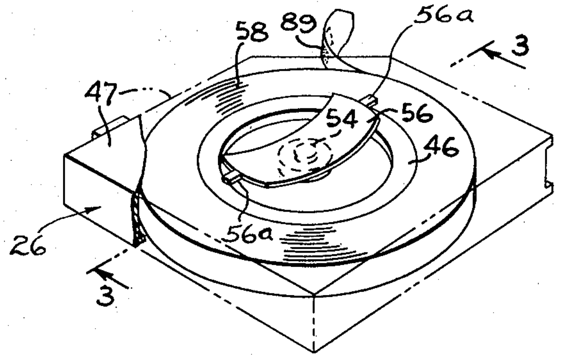
FIG_2
FIG_4
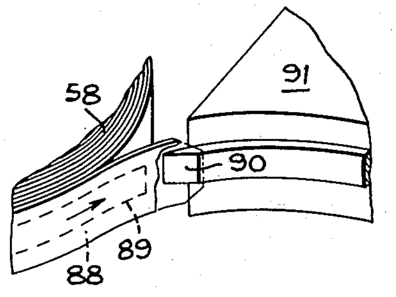
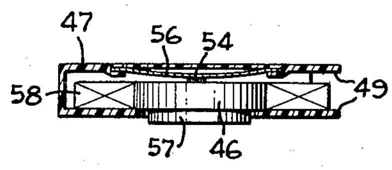
FIG_3

TAPE ROLL LOADING AND CENTERING DEVICE FOR TAPE TRANSPORT

BACKGROUND OF THE INVENTION

This invention pertains to tape transport apparatus and particularly to a means for disposing a roll of tape precisely upon the axis of rotation of a support spindle and precisely normal to the axis of rotation of the spindle. The invention is particularly useful where the tape roll is carried within an envelope or cartridge.

Heretofore, rolls of tape carried within cartridges have been provided for readily disposing the hub of the roll upon a support spindle but such arrangement has not been without problems. A major problem involved has been one of providing a tape cartridge unit wherein the hub of the roll of tape can be readily and easily disposed onto the support spindle without leaving any substantial lateral clearance permitting the hub to generate "run-out" as the hub is rotated.

Another problem has been one of providing the hub of the roll of tape in a precisely perpendicular plane to that of the axis of rotation of the spindle which supports the hub while retaining the features of permitting a relatively easy attachment of the hub to the support spindle. It has also been necessary to dispose the mid-plane of the roll midway between the inner confronting walls of the cartridge envelope.

Accordingly, there has been a continuing need, particularly where the tape cartridge is arranged to be first fed through a slot and then onto a protruding support spindle.

SUMMARY OF THE INVENTION AND OBJECTS

In general, there has been disclosed herein a tape transport apparatus having a rotatable annular drive body and a carriage assembly for supporting a roll of tape for rotation and lateral translation relative to the drive body. The carriage assembly comprises a spindle for mounting the roll of tape thereon which spindle carries an annular support member having a registration surface disposed to define a plane extending transversely of the spindle. The spindle further includes an outer end portion which is axially movable between advanced and retracted positions relative to the registration surface noted above. The movable outer end portion of the spindle includes a surface of revolution adapted to snugly seat within an opening of like conformation formed axially in a hub of the roll of tape so as to center the hub upon the protruding end portion of the spindle. Means have been further provided for resiliently urging the protruding spindle portion axially outwardly toward its protruding position so as to support the roll and hub free and clear of the registration surface. Further, means for urging the hub in opposition to the urging of the last noted means serves to center the hub upon the protruding spindle portion to register an end (side face) of the hub with the registration surface and in this manner to dispose the roll in a plane normal to the spindle while being centered relative to its axis of rotation.

In general, it is an object of the present invention to provide an improved apparatus for centrally locating a roll of tape upon a support spindle in a plane normal to the axis of rotation of the spindle.

Another object of the present invention is to provide an improved apparatus and device for accommodating the loading of rolls of tape onto a support spindle particularly where the roll is contained in a cartridge envelope.

Another object of the present invention is to provide an improved tape transport apparatus characterized by means for automatically pressing down upon a tape cartridge in successive stages, first to center the hub of the roll of tape relative to the axis of rotation thereof and secondly to center the plane of the roll of tape and the hub centrally between the side walls of the cartridge in a position normal to the axis of rotation of the spindle.

The foregoing and other objects of the invention will become more readily evident from the following detailed description of a preferred embodiment.

BRIEF DESCRIPTION OF THE DRAWING

FIG. 1 shows a perspective view with portions broken away for clarity of a tape transport apparatus according to the invention;

FIG. 2 shows a perspective schematic view with portions broken away of a tape roll cartridge assembly as utilized in the apparatus of FIG. 1;

FIG. 3 shows a transverse section view taken along the line 3—3 of FIG. 2;

FIG. 4 shows an enlarged detail diagrammatic perspective view illustrating that portion of FIG. 1 indicated in the region designated by the view line 4;

DETAILED DESCRIPTION OF A PREFERRED EMBODIMENT

Figure 5:
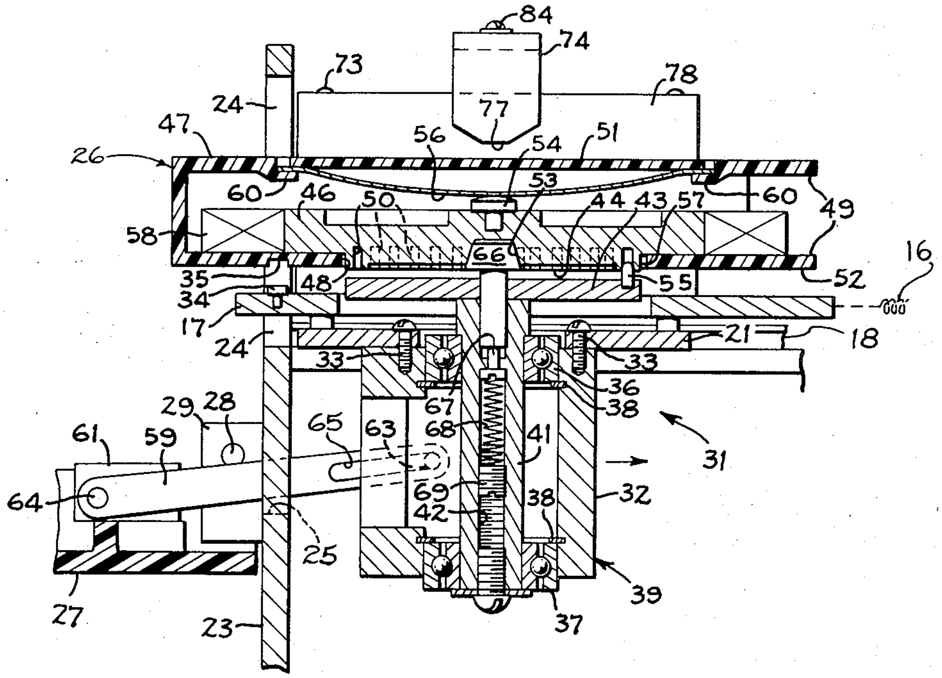
FIG. 5 shows a side elevation centerline section view of a tape transport apparatus wherein the roll of tape has initially been received upon a support spindle.

As shown in the preferred embodiment disclosed in FIG. 1, a tape transport assembly 10 comprises, in general, an annular rotating resilient drive body, such as a capstan 11 formed with a resilient tire 12 therearound. The principles of operation of such a transport assembly, in general, are disclosed in U.S. Pat. Nos. 3,370,803 and 3,370,804 wherein a motor is directly coupled to rotate the drive capstan 11 while supply and take-up rolls 13, 14 ride in directly driven relation to tire 12. As tape is fed from the supply to the take-up roll, the carriages supporting them will respectively advance and retreat relative to the axis of rotation of capstan 11. Further, as disclosed in the above identified patents, means for applying a limited tension to the span of tape extending between the supply and take-up rolls includes a spring 16 coupled directly between the two carriages supporting rolls 13, 14 as well as the means disclosed therein (or other suitable means) for providing a greater compressive force at the take-up interface defined between roll 14 and tire 12 than at the interface defined between supply roll 13 and tire 12.

Accordingly, as herein disclosed, a carriage plate 17 or platform moves between retracted and advanced positions relative to the axis of rotation of capstan 11. Thus, beneath carriage plate 17 a pair of guideways 18, 19 is formed with an elongate notch or channel to receive a slide plate 21 secured by suitable means in supporting relation to plate 17 so as to move as guided by the members 18, 19. Guideway members 18, 19 are suitably secured upon a base plate 22 which constitutes the main frame of the apparatus.

A front panel 23 includes a slot-like opening 24 through which a tape cartridge assembly 26 may be readily passed for loading and unloading the cartridge into and out of transport assembly 10.

Means forming a closure of transport material serves to cover slot 24 and comprises the rectangular box-shaped door or cover 27 pivotally secured at its lower end by the pivot pins 28 protruding laterally outwardly from their respective mounting blocks 29 protruding from the face of panel 23. As thus arranged, cover 27 is pivotable away from panel 23 to permit the insertion of a cartridge assembly 26 through slot 24.

Means forming a carriage assembly 31 movable to advance and retreat relative to the axis of rotation of capstan 11 and to support a roll of tape thereon for rotation comprises the carriage plate 17 supported upon slide plate 21 disposed in the slots formed by guideway members 18, 19 and a bearing block 32 secured, as for example, by means of screws 33 to slide plate 21 to depend beneath carriage plate 17.

Bearing block 32 includes a pair of axially spaced ball bearings 36, 37 secured in place by means of the snap rings 38 disposed on the internal diameter of bearing block 32. Ball bearings 36, 37 serve to support a spindle assembly 39 for rotation.

Spindle assembly 39 comprises an elongate hollow axle 41 with a threaded bore section 42 and carrying at its upper end a transversely extending turntable 43 forming a registration member defining a support plane disposed normal to the axis of rotation of axle 41. Thus, the top surface of turntable member 43 forms a reference against which the end surface 44 of hub 46 abuts during rotation of hub 46.

The end surface 44 of hub 46 confronting turntable 43 includes a number of very closely spaced holes 50 for engaging a connecting pin 55 carried to protrude upwardly from the registration surface of turntable 43. Thus, as hub 46 becomes mounted upon pin element 66, it is readily evident that one of the holes 50 will engage connecting pin 55 to form a firm drive connection therebetween.

Cartridge assembly 26 comprises the envelope 47 formed with a circular opening 48 through its bottom wall and a tape dispensing opening 49 formed along one side through which tape can be withdrawn.

The spacing between the walls 51, 52 is sufficiently wide to accommodate entry therein of tire 12 of capstan 11 riding in contact with tape on hub 46. Hub 46 includes a central mounting opening 53 formed as a surface of revolution, preferably conical. Hub 46 includes, on the axis thereof, an anti-friction rounded button 54 against which a leaf spring element 56 acts to retain the shoulder 57 (FIGS. 5, 6) disposed normally within opening 48. In this manner, and during normal storage, for example, hub 46 and its associated roll of tape 58 will be retained in protective relation within envelope 47. Tabs 60 on wall 51 engage tangs *56a* of spring 56 to retain the latter within envelope 47.

Means are provided for withdrawing carriage assembly 31 toward slot 24 upon opening of door 27 and for keeping door 27 in the open condition. Thus, the simple over-center link 59 is pivotally coupled at one end to a pivot block 61 formed on the interior surface of door 27. A slot 65 in the other end of link 59 is pivotally coupled by means of the pivot pin 63 protruding from the side of bearing block 32 via a slot 25 in the face of panel 23. Inasmuch as spring means 16 will serve at all times to tend to draw carriage plate 17 and spindle assembly 39 toward capstan 11, it is possible to dispose pivot connection 64 of link 59 to lie below hinge pins 28 as shown in FIG. 5 so that the spring means 16 serves to hold door 27 in an open position by moving link 59 downwardly "over-center."

Means as now to be described serve to center hub 46 relative to the axis of rotation of axle 41 and to register the plane of rotation of hub 46 normal to the axis of rotation of axle 41. Thus, a mounting and hub-centering pin element 66 protrudes from turntable member 43 and is formed as a surface of revolution, preferably conical, conforming to the surface of revolution of opening 53 in hub 46 so as to receive and center hub 46 thereon.

The stem portion of conical pin element 66 is inserted snugly coaxially of axle 41 and is axially retained by means of a screw 67 for abutting against a shoulder 70 in axle 41. Spring 68 carried within bore 42 urges pin element 66 outwardly thereof and is retained therein by threaded plug 69.

The top portion of pin element 66 protrudes sufficiently above turntable 43 so as to permit hub 46 to become readily adjusted and seated upon the conical surface of pin element 66 by light downward pressure applied thereto. Pin element 66 moves axially between a protruding and depressed position so as to maintain hub 46 spaced from turntable member 43 when pin 66 is in its protruding position.

Means for guiding the envelope of cartridge assembly 26 so as to laterally align opening 53 with pin element 66 in seating hub 46 thereon includes the two side blocks 71, 72 secured by means of elongate screws 73 to carriage plate 17.

Means for insuring the maintenance of a clearance between shoulder 57 and the edge of opening 48 comprises the stud 34 riveted to plate 17 for loosely engaging the opening 35 formed into the underside of cartridge wall 52.

Means responsive to lateral translation of the carriage assembly 31 toward capstan 11 are provided for engaging and urging envelope 47 and hub 46 thereof toward turntable member 43 under such translation so as to first overcome the urging of spring 68 and then to overcome the urging of spring 56 within cartridge 26. In this manner, hub 46 becomes first snugly seated in opening 53 while remaining clear of turntable 43 and then hub 46 becomes registered with the top surface of turntable member 43 so as to dispose the hub precisely normal to the axis of rotation thereof.

The foregoing generalized means includes a pair of inverted J-shaped hold-down clamps 74, 76 disposed across the top of side blocks 71, 72 respectively. The confronting end portions of clamps 74, 76 are tapered for engaging the wall 51 of cartridge assembly 26.

Figure 7:
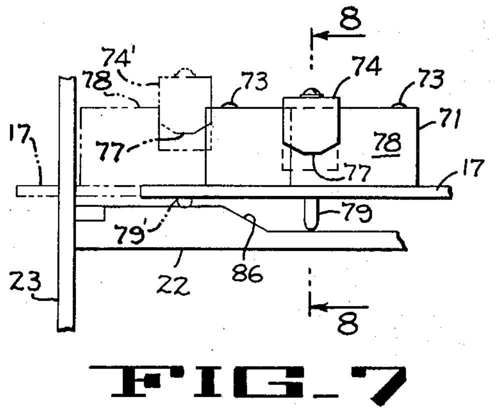
FIG. 7 shows a side elevation diagrammatic view of means for activating the hold-down clamps disclosed in FIGS. 5 and 6.
Figure 8:
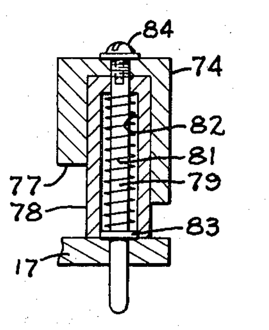
FIG. 8 shows an elevation section view taken along the line 8—8 of FIG. 7.

Each of clamps 74, 76 is movable vertically between advanced and retracted positions as shown in FIGS. 7 and 8 relative to blocks 71, 72 and each of the two clamps 74, 76 is mounted and operated in the same manner. Accordingly, a description of one should be considered as a description of both.

Clamp 74 includes a cartridge-engaging lip 77 disposed alongside the inner sidewall 78 of block 71. An elongate pin 79 extends downwardly through carriage plate 17 and is resiliently urged downwardly by means of a spring 81 interposed between the upper end of a channel 82 formed within block 71 and a collar 83 formed integral with the shank of pin 79 at the lower end of channel 82.

The upper end of pin 79 is secured, as by means of the screw 84, to the top of clamp 74 extending across the top of block 71.

As thus arranged, upward movement applied to the lower end of pin 79 serves to lift clamps 74, 76 against the downward urging of spring 81.

Wedges or cams 86, 87 are formed on the top surface of base plate 22 for engaging the bottom end of pins 79 as carriage plate 17 is drawn leftwardly as shown in FIG. 7. As wedges 86 engage the lower end of pins 79, it will be readily evident that clamps 74, 76 will be elevated so as to form a relatively large vertical clearance between the underside of lips 77 and the top surface of turntable 43. In this way, loading of the cartridge assembly 26 can be readily effected and, upon closure of door 27, link 59 will serve to permit spring means 16 to draw spindle assembly 32 to the right as shown in FIG. 5 and permit pins 79 to lower clamps 74, 76 gradually to press firmly against the top side edge margins of envelope 47.

Figure 6:
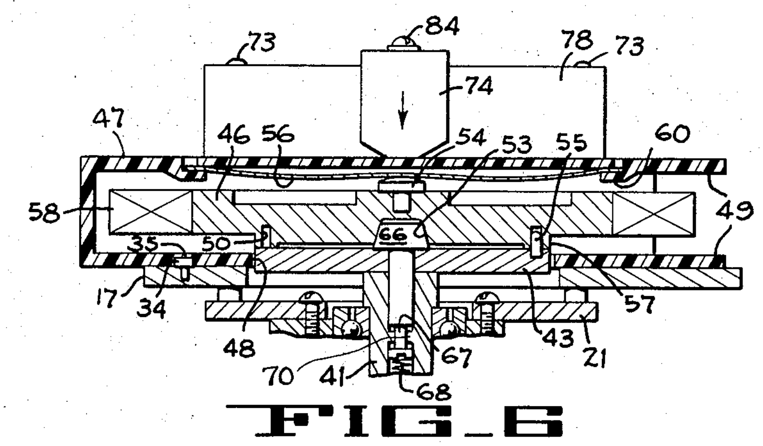
FIG. 6 shows a view of a portion of FIG. 5 showing the position of a roll of tape disposed in the mid-plane of the cartridge in which it is contained after the cartridge has been secured within the apparatus.

During this downward movement of clamps 74, 76, pin 66 is first seated snugly within opening 53 for purposes of axially centering the axis of rotation of hub 46 with respect to that of axle 41 and, after aligning hub 46 axially, the force of springs 81 is sufficient to draw clamps 74, 76 downwardly with enough force to overcome the counteracting force of spring element 56 and thereby collapse spring element 56 in the manner shown in FIG. 6.

At this stage, the undersurface of hub 46 will firmly abut turntable 43 in face-to-face relation with the registration surface of turntable 43 perpendicular to the axis of rotation of axle 41.

Finally, means are provided herein as heretofore known for peeling a loose end of the roll of tape free of the roll of tape and for guiding it to the take-up hub via an arcuate surface portion of capstan 11 and to pass the tape in transducing relation to a magnetic recording transducer 85.

Thus, the tape 58 (FIG. 4) wrapped about hub 46 includes, on its outermost convolution, a leader characterized by adhesive margins 88 and a non-adhesive central strip 89 adapted to be engaged by a peeling element 90 formed generally as a rib machined onto the interior surface of a mounting block 91 whereby, as the free end of the leader engages the peeling blade 90, central strip 89 will slide relatively friction-free along blade 90 so as to wedge the adherent margins 88 free from attachment to the outermost convolution.

The channel 92 defined between mounting blocks 91 and the periphery of tire 12 is sufficiently confined so as to urge the leader along a confined path past transducer 85 and ultimately into engagement with the hub of take-up roll 14. At that point, the compressive action of capstan 11 against the hub on roll 14 serves to press the leader into attachment with the hub to commence winding of take-up roll 14.

I claim:

1. In a tape transport apparatus of a type having a length of tape wrapped to form supply and take-up rolls and a rotating drive capstan to engage and drive the tape from one roll to the other, and wherein one of the rolls includes an annular hub disposed within an envelope open at one side edge for passing tape to and from the hub, a support carriage movable between advanced and retracted positions relative to the capstan while carrying said one roll, said carriage including a rotatable turntable element having a registration surface disposed normal to the axis of rotation of said turntable element, a centering pin on said axis of rotation and carried to protrude above the registration surface to rotate therewith, said pin being movable between protruding and retracted positions, means yieldingly urging said pin to its protruding position, said pin having a periphery formed as a surface of revolution adapted to engage an opening of like conformation disposed at the center of the hub and serving to support the end of the hub in parallel closely spaced relation to said registration surface, and means for moving said hub into engagement with said registration surface while yieldingly moving said pin to its retracted position so as to center said hub on said pin and axis of rotation free of lateral movement between said pin and said hub.

2. In a tape transport apparatus having a rotatable annular drive body, a carriage assembly for supporting a roll of tape for rotaton and lateral translation relative to said body comprising a spindle for mounting the roll of tape thereon, an annular support member carried by said spindle and having a registration surface disposed to define a plane extending transversely of said spindle, said spindle having an axially outer end portion movable between advanced and retracted positions relative to said registration surface and formed as a surface of revolution adapted to snugly seat within an opening of like conformation formed axially in a hub of the roll of tape for centering the hub upon said end portion, means resiliently urging said end portion toward its said advanced position to support said roll and hub clear of said registration surface, and means for urging said hub in opposition to the urging of the last named means to center said hub upon said end portion and to register an end of said hub with said surface to dispose said roll in a plane normal to said spindle and centered relative to its axis of rotation.

3. In a tape transport apparatus according to claim 2 further comprising means securing the last named means to travel with said carriage assembly during said lateral translation thereof, means for withdrawing said carriage away from said body, and means serving to relieve the urging of said last named means in response to such withdrawal.

4. In a tape transport apparatus having a rotatable annular drive body, a carriage assembly including a turntable for supporting a roll of tape for rotation and to move between retracted and advanced positions relative to said body, a support pin protruding from said turntable and formed as a surface of revolution adapted to snugly seat within an opening of like conformation formed axially in a hub of the roll of tape with the end of the hub of said roll of tape disposed in spaced coplanar relation to said turntable, the height of said pin serving to provide a sufficient clearance between said turntable and the confronting end of the hub of said roll to permit said hub to be centrally aligned with said pin under application of compression thereto, means for moving said carriage between said advanced and retracted positions, means forming an envelope about said roll while exposing said hub end and said opening therein to respectively engage said turntable and pin, and retaining means movable between advanced and retracted positions relative to said turntable for engaging said envelope and drawing same toward said turntable under advancing movement of said turntable toward said body to urge said hub downwardly onto said pin and turntable.

5. In a tape transport apparatus having a rotatable annular drive body, a carriage for supporting a roll of tape for rotation and lateral translation relative to said body, a rotatable turntable supported by said carriage and movable therewith, a roll of tape comprising an annular hub formed with an opening centrally thereof as a surface of revolution, a length of tape wrapped about said hub, an envelope of semi-rigid material enclosing said roll, and first spring means interposed between the inner wall of said envelope and the hub to urge the hub toward a wall opposite the first named wall, a mounting and roll-centering pin element protruding from said turntable and of like conformation to said opening to receive and seat said opening and hub thereon, said pin being movable axially between protruding and depressed positions to maintain said hub spaced from said turntable when said pin is in its protruding position, second spring means normally resiliently urging said pin toward its said protruding position, means for guiding said envelope laterally to align said opening with said pin element to seat said hub thereon, and means responsive to lateral translation of said carriage toward said body for engaging and urging said envelope and hub toward said turntable to first overcome the urging of said second spring means to snugly seat said pin in said opening with said hub clear of said turntable and then to overcome the urging of said first spring means to register said hub against the turntable to dispose said hub normal to the axis of rotation thereof.

6. A cartridge assembly comprising a circular hub, a length of tape wrapped about said hub to form a roll thereof, means carried by the outermost convolution of tape serving to retain said convolution to the roll, means forming an envelope about said roll including spaced walls disposed respectively across the ends of said roll, one of said walls being formed with an opening centrally thereof and extending through same for receiving a mounting spindle therethrough, a central mounting opening formed in said hub on the axis of rotation thereof for receiving the spindle, the last named said opening including a bearing surface formed to extend transversely of the axis of rotation of the hub for engaging and seating said hub upon the spindle and serving in response to forces urging said spindle thereagainst to move the hub laterally so as to center the hub upon the spindle at its axis of rotation, spring means disposed between said hub and the other of said walls, and means disposed on the other side of said hub continuously engaging said spring means to continuously urge said hub toward said one wall.

7. A cartridge assembly according to claim 6 wherein said bearing surface comprises a conically shaped opening axially of said hub.

* * * * *